(12) United States Patent
Chopra et al.

(10) Patent No.: US 7,675,502 B2
(45) Date of Patent: Mar. 9, 2010

(54) COLOR ELECTROPHORETIC DISPLAY DEVICE

(75) Inventors: Naveen Chopra, Oakville (CA); Jurgen H. Daniel, Mountain View, CA (US); Gabriel Iftime, Mississauga (CA); Peter M. Kazmaier, Mississauga (CA); Robert A. Street, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 726 days.

(21) Appl. No.: 11/468,652

(22) Filed: Aug. 30, 2006

(65) Prior Publication Data

US 2008/0055234 A1    Mar. 6, 2008

(51) Int. Cl.
G09G 3/34    (2006.01)

(52) U.S. Cl. ..................... 345/107; 359/269
(58) Field of Classification Search .............. 345/107; 359/269

See application file for complete search history.

(56) References Cited

U.S. PATENT DOCUMENTS

| | | | |
|---|---|---|---|
| 3,668,106 A | 6/1972 | Ota | |
| 4,272,596 A | 6/1981 | Harbour et al. | |
| 4,338,390 A | 7/1982 | Lu | |
| 5,278,020 A | 1/1994 | Grushkin et al. | |
| 5,290,654 A | 3/1994 | Sacripante et al. | |
| 5,308,734 A | 5/1994 | Sacripante et al. | |
| 5,344,738 A | 9/1994 | Kmiecik-Lawrynowicz et al. | |
| 5,346,797 A | 9/1994 | Kmiecik-Lawrynowicz et al. | |
| 5,364,729 A | 11/1994 | Kmiecik-Lawrynowicz et al. | |
| 5,370,963 A | 12/1994 | Patel et al. | |
| 5,403,693 A | 4/1995 | Patel et al. | |
| 5,418,108 A | 5/1995 | Kmiecik-Lawrynowicz et al. | |
| 5,593,807 A | 1/1997 | Sacripante et al. | |
| 6,017,584 A | 1/2000 | Albert et al. | |
| 6,113,810 A | 9/2000 | Hou et al. | |
| 6,387,581 B1 | 5/2002 | Moffat et al. | |
| 6,395,445 B1 | 5/2002 | Toth et al. | |
| 6,525,866 B1 | 2/2003 | Lin et al. | |
| 6,574,034 B1 | 6/2003 | Lin et al. | |
| 6,577,433 B1 | 6/2003 | Lin et al. | |
| 6,727,873 B2 | 4/2004 | Gordon, II et al. | |

(Continued)

OTHER PUBLICATIONS

U.S. Appl. No. 11/419,436, filed May 19, 2006 in the name of Naveen Chopra et al.

(Continued)

*Primary Examiner*—Amare Mengistu
*Assistant Examiner*—Koosha Sharifi
(74) *Attorney, Agent, or Firm*—Oliff & Berridge, PLC

(57) ABSTRACT

Set forth is an electrophoretic display device including a display region between substrates, at least one of which is transparent, the display region including a multiplicity of pixels, wherein one or more of the pixels have three or more subpixels, the three or more subpixels being made up of individual reservoirs that each contain a display medium of one or more set of colored particles in a dielectric fluid. The display mediums include two different colors therein so that the subpixel is capable of exhibiting each of the two different colors, and each of the three or more subpixels include a display medium having a combination of two colors that is different from the combinations of two colors of the display mediums of the other of the three or more subpixels. A method of displaying a full color image with the display device is also provided.

17 Claims, 5 Drawing Sheets

U.S. PATENT DOCUMENTS

| | | | |
|---|---|---|---|
| 6,788,449 B2 | 9/2004 | Liang et al. | |
| 6,822,782 B2 * | 11/2004 | Honeyman et al. | 359/296 |
| 6,850,355 B2 | 2/2005 | Liang et al. | |
| 7,034,987 B2 | 4/2006 | Schlangen | |
| 2002/0180688 A1 * | 12/2002 | Drzaic et al. | 345/107 |
| 2003/0132925 A1 | 7/2003 | Lin et al. | |
| 2003/0231162 A1 * | 12/2003 | Kishi | 345/107 |
| 2005/0137278 A1 | 6/2005 | Fromm et al. | |
| 2006/0139748 A1 | 6/2006 | Ahn et al. | |
| 2006/0202949 A1 * | 9/2006 | Danner et al. | 345/107 |
| 2006/0221049 A1 * | 10/2006 | Miyasaka et al. | 345/107 |

OTHER PUBLICATIONS

U.S. Appl. No. 11/419,434, filed May 19, 2006 in the name of Naveen Chopra et al.

U.S. Appl. No. 11/419,472, filed May 19, 2006 in the name of Man-Chung Tam et al.

U.S. Appl. No. 11/169,924, filed Jun. 30, 2005 in the name of Ping Liu et al.

Endo et al.; "Late-News Poster: Color In-Plane EPD Using an Anisotropic Scattering Layer;" *SID Digest Technical Papers*, p. 674 (2004).

Arisawa et al., "Photo-Addressable E-Paper and Toner Display"; IS&T's NIP20: International Conference on Digital Printing Technologies, Final Program and Proceedings, p. 922 (2004).

* cited by examiner

COLOR ELECTROPHORETIC DISPLAY DEVICE

BACKGROUND

Described herein is an electrophoretic display device. More particularly, described is a full color electrophoretic display device having a novel structure that permits the display to exhibit truer color with good brightness while utilizing a straightforward one or two color particle display system.

The electrophoretic display devices herein are thus capable of generating images, including full color images. The electrophoretic displays herein may be used for any display application, and particularly any display application where the image displayed may be changed, including, for example, reimageable paper, electronic books, electronic signage, watch, monitor and/or cell phone displays, and the like.

Electrophoretic displays are well known in the art. An electrophoretic display generally comprises a suspension of one or two charged pigment particles colloidally dispersed in a clear or colored liquid of matching specific gravity and contained in a cell comprising two parallel and transparent conducting electrode panels. The charged particles are transported between the electrode panels under the influence of an electric field, and can therefore be made to display an image through appropriate application of the electric field on the electrodes. The advantages of electrophoretic displays as a means for providing information and displaying images has been well appreciated.

U.S. Pat. No. 4,272,596, incorporated herein by reference in its entirety illustrates an electrophoretic display structure. The electrophoretic display device comprises a white marking material such as titanium dioxide suspended in a colloidal dispersion containing black colorant such as colloidal size iron oxide particles known as ferrofluids.

U.S. Pat. No. 6,113,810, incorporated herein by reference in its entirety, describes a dielectric dispersion for use in an electrophoretic display that includes a dielectric fluid, a first plurality of particles of a first color having a surface charge of a selected polarity dispersed within the dielectric fluid and a second plurality of particles of a second color having a surface charge of opposite polarity to that of the first plurality and a steric repulsion thereto preventing coagulation of the first and second plurality of particles.

U.S. Pat. No. 6,017,584, incorporated herein by reference in its entirety, discloses encapsulated electrophoretic displays in which particles encapsulated therein are dispersed within a suspending, or electrophoretic, fluid.

U.S. Pat. Nos. 6,525,866 and 6,577,433, each incorporated herein by reference in its entirety, disclose an electrophoretic display liquid composition for use in an electrophoretic display device that has a multiplicity of individual reservoirs, each containing a display liquid comprised of two sets of particles dispersed in a transparent liquid system.

Electrophoretic display is thus based on the migration of charged particles suspended in an insulating fluid under the influence of an electric field. As discussed above, the display systems may comprise one-particle and two-particle systems. One-particle systems typically comprise one set of same color particles dispersed in a fluid that may have a color different from that of the particles. Two-particle systems typically comprise two sets of colored particles, with each set of particles having a different color, dispersed in a fluid that is typically colorless/clear. A downside to these conventional one-particle and two-particle systems has been the difficulty in achieving full color displays using such systems.

Up to this point, it has been believed that the path to reflective colored electrophoretic displays would require significant modification of the traditional one-particle and two-particle display systems. This is because such systems could at best achieve only two colors.

Current approaches for color devices involve the use of color filter overlays on black and while two-particle display systems, or the use of lateral particle migration of monochrome particles with colored backplanes (referred to as shuttered displays).

An example of an electrophoretic display with a color filter is U.S. Pat. No. 6,850,355, describing an electrophoretic display comprising a transparent top viewing electrode, a bottom electrode and a plurality of isolated cells having well-defined size, shape and aspect ratio. The cells are filled with charged pigment particles dispersed in a dielectric solvent or solvent mixture, and a color filter is placed over the top transparent electrode.

Each of these approaches to making a full color electrophoretic display has drawbacks. For the color filter overlay approach, the color filter is typically located on top of the display device and significantly reduces the amount of incident light reflected back to the viewer, with only about 33% of the incident light being reflected back to the viewer. The result is that although color is perceived, the display is very dark in appearance. Shuttered displays require the use of lateral electrodes, and the design electronics can be very complex. See, for example, Endo et al.; Late-News Poster: Color In-Plane EPD Using an Anisotropic Scattering Layer; SID Digest Technical Papers, p. 674 (2004) and Arisawa et al.; Photo-Addressable E-Paper and Toner Display; IS&T's NIP20: International Conference on Digital Printing Technologies, Final Program and Proceedings, p. 922 (2004).

While known electrophoretic display devices, compositions and processes for displaying images are suitable for their intended purposes, a need remains for a full color electrophoretic display with a simpler, cost effective design that achieves full color and good brightness. Thus, there exists a need for a simpler, more vivid color electrophoretic device, such as a colored particle device.

SUMMARY

In embodiments, described is an electrophoretic display device, comprising a display region between substrates, at least one of which is transparent, the display region including a multiplicity of pixels, wherein one or more of the pixels comprise three or more subpixels, the three or more subpixels being comprised of individual reservoirs that each contain a display medium comprised of one or more set of colored particles in a dielectric fluid, the display medium including two different colors therein so that the subpixel is capable of exhibiting each of the two different colors, and wherein each of the three or more subpixels include a display medium having a different combination of two colors from the display mediums of all of the other of the three or more subpixels.

In further embodiments, described is an electrophoretic display device, comprising a display region between substrates, at least one of which is transparent, the display region including a multiplicity of pixels, wherein one or more of the pixels comprise three or more subpixels that are each individually addressable via an electrode associated therewith, the three or more subpixels being comprised of individual reservoirs that each contain a display medium comprised of one or more set of colored particles in a dielectric fluid, the display medium including at least two different colors therein so that the subpixel is capable of exhibiting each of the at least two different colors, and wherein a first subpixel of the three or more subpixels includes a display medium having a combination of a first color and a second color, a second subpixel of the three or more subpixels includes a display medium having a combination of the first color and a third color, and a third subpixel of the three or more subpixels includes a display medium having a combination of the second color and the third color.

In embodiments, also described is a method of displaying an image in an electrophoretic display device that is comprised of a display region between substrates, at least one of which is transparent, the display region including a multiplicity of pixels, wherein one or more of the pixels comprise three or more subpixels that are each individually addressable via an electrode associated therewith, the three or more subpixels being comprised of individual reservoirs that each contain a display medium comprised of one or more set of colored particles in a dielectric fluid, the display medium including at least two different colors therein so that the subpixel is capable of exhibiting each of the at least two different colors, and wherein a first subpixel of the three or more subpixels includes a display medium having a combination of a first color and a second color, a second subpixel of the three or more subpixels includes a display medium having a combination of the first color and a third color, and a third subpixel of the three or more subpixels includes a display medium having a combination of the second color and the third color, the method comprising applying an electric field via the electrode to the two of the three or more subpixels that include the first color, second color or third color desired to be displayed by the pixel to effect movement of the one or more set of colored particles in the display medium to display the desired color on a viewing side of the display device, wherein for displaying the first color, the electric field is applied to the first subpixel and to the second subpixel in a manner to display the first color on the viewing side, wherein for displaying the second color, the electric field is applied to the first subpixel and to the third subpixel in a manner to display the second color on the viewing side, and wherein for displaying the third color, the electric field is applied to the second subpixel and to the third subpixel in a manner to display the third color on the viewing side.

EMBODIMENTS

Figure 1:
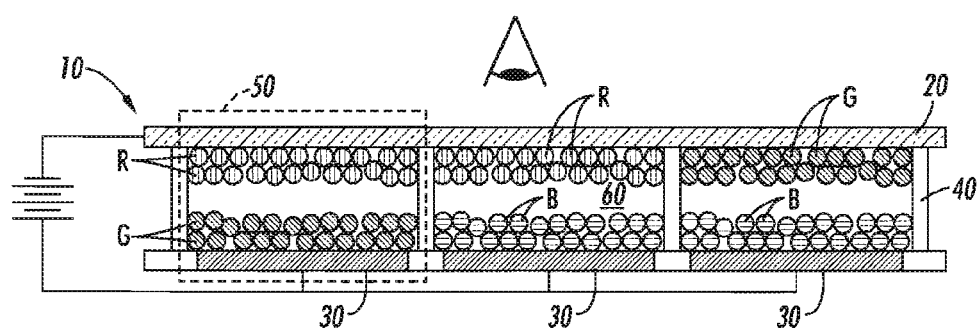
FIG. 1 illustrates an example structure of a pixel of an electrophoretic display device as described herein.

Electrophoretic display devices described herein comprise a display region located between substrates, at least one of the substrates being transparent and comprising a viewing side of the device from which a viewer can view an image formed in the display region. Any suitable display device design may be used in this regard. That is, any suitable design for an electrophoretic display device may be used without limitation. As an example of a suitable electrophoretic display device design not specifically described herein that may nevertheless be used with the present display medium, U.S. Pat. No. 6,788,449, incorporated herein by reference in its entirety, is identified.

In embodiments, the viewing side transparent substrate may either comprise or include thereon a transparent electrode layer. The opposite substrate, on the non-viewing side of the device, may either comprise or include thereon an electrode pattern. The pattern is such that a single electrode or a portion of an electrode is associated with each of the subpixels of the display device, as will be described further below.

Conductive substrates may be used. Any suitable materials may be used without limitation, for example including materials presently known and used or that may be used in the future in the art. At least one of the conductive substrates, in particular at least the top conductive substrate through which the images formed by the device may be viewed, should be transparent in order to enable such viewing. Both substrates may be transparent, if desired. The bottom or back substrate need not be transparent, and may instead be, for example, a light reflecting or light absorbing material. As suitable materials that may be used as conductive substrates, mention may be made of conductive polymer films, for example polymer films coated with a transparent conductive material such as indium tin oxide (ITO), such as polyethylene terephthalate (PET) films, for example MYLAR (Du Pont), polyethylene napthalate (PEN) films, polyethersulfone (PES) films and the like, conductive glass films, such as ITO coated glass, and conductive thin metals. For transparency, ITO coated polymer films and glass are suitable. The substrates may either be flexible or rigid, depending on whether a flexible or rigid device is desired.

The substrates that sandwich the display region therebetween may have a length and width corresponding to the overall length and width of the electrophoretic display device. The substrates thus may be continuous, unitary films that are not present as separated pieces over just individual reservoirs of the display device, although a plurality of segregated substrates may also be used. The substrates may be made to be as thin as possible while still maintaining appropriate conductive properties and structural integrity. For example, the substrates may have a height, or thickness, of from about 10 microns to about 500 microns, such as from about 10 to about 250 microns or from about 20 to about 100 microns.

The display region of the device located between the substrates may have a thickness of from, for example, about 5 to about 1,000 μm, such as from about 10 to about 500 μm or from about 20 to about 350 μm.

The display region is comprised of a multiplicity of pixels that make up the overall display region of the device. A multiplicity refers to, for example, from about 2 to about 100,000,000, or potentially more, such as from about 100 to about 50,000,000 or from about 1,000 to about 1,000,000. Thus, for example, if each of the multiplicity of pixels is about 100 μm across, a square of 1,000×1,000 pixels (or about a 4 inch×4 inch display) would have about 1,000,000 total pixels.

Each pixel of the display region may be segregated from adjacent pixels through the use of any physical spacer material and the like. Each pixel may have a width of from about 10 μm to about 5,000 μm, such as from about 10 μm to about 3,000 μm or from about 10 μm to about 500 μm.

One or more of the pixels, and desirably all or substantially all of the pixels, are further subdivided into three or more subpixels. Here again, any suitable spacer material, that may be the same or different from the spacer material used to segregate individual pixels, may be used in subdividing the pixels into three or more subpixels. The subpixels may be made to have a width of from about 5 μm to about 1,000 μm, such as from about 10 μm to about 500 μm or from, about 10 μm to about 100 μm. The display medium to be used within the subpixels contains particles of a size smaller than the width/diameter of the subpixel in order for the device to function.

The pixels/subpixels of the display device thus define a multiplicity of individual reservoirs that each contain a display medium. As will be detailed further below, the display medium is comprised of one or more than one set of colored particles dispersed in a dielectric fluid that is either colored or is substantially transparent and substantially colorless. Reservoir refers to, for example, any unit such as a subpixel containing, or capable of containing, display medium therein, and includes, for example, units separated by a spacer material such as, for example, units separated by a physical device such as ribs and the like, units defined by pockets, cavities or bubbles formed in a single sheet or between two sheets, units comprised of capsules or microcapsules in a sheet or layer, and the like.

Thus, any suitable spacer design may be used. For example, the spacer may be of the type described in U.S. Patent Publication No. 2003-0132925 A1, incorporated herein by reference in its entirety, or of any of the types described in U.S. application Ser. No. 11/419,436, incorporated herein by reference in its entirety.

FIG. 1 illustrates an embodiment of an electrophoretic display device. Shown in FIG. 1 is a single pixel 10 of a display device. The display device includes a top, viewing side substrate 20, for example a conductive ITO coated glass electrode substrate. On the opposite side of the display device is shown a rear substrate, in this case comprised of a multiplicity of segmented rear electrodes 30 associated with each of the three subpixels 50 of the illustrated pixel of the display device. Each of the subpixels 50 includes display medium 60 therein, the display medium providing the color for the display device as will be described below. As shown in FIG. 1, voltage may be applied to each of the subpixels individually, which voltage creates application of an appropriate electric field to the subpixel to manipulate movement of the colored particles in the display medium of the subpixel so as to cause the subpixel to display a desired color to a viewer viewing the device through the top substrate.

In the electrophoretic display device, a truer and brighter full color display is achieved through the use of the three or more subpixels that contain different combinations of colors for display. For example, the three or more subpixels are comprised of individual reservoirs that each contain a display medium comprised of one or more set of colored particles in a dielectric fluid. The display medium of each such subpixel includes at least two different colors therein so that each subpixel is capable of exhibiting each of the at least two different colors. In addition, each of the subpixels of a given pixel desirably includes a display medium having a different combination of two colors from the display mediums of all of the other of the three or more subpixels.

Thus, in embodiments, one or more of the pixels comprise three subpixels, the display medium of the three subpixels including combinations of two colors selected from among three total colors, and wherein each of the three subpixels comprises a different combination of two of the three total colors.

For example, if it is intended for a pixel to be able to display a total of three colors, for example each of the three primary colors of red, green and blue, thereby enabling the entire display region to be able to display a full color image via an appropriate combination of different pixels exhibiting different ones of the primary colors, then a first subpixel of the three or more subpixels may include a display medium having a combination of the first desired color and the second desired color, a second subpixel of the three or more subpixels may include a display medium having a combination of the first desired color and the third desired color, and a third subpixel of the three or more subpixels may include a display medium having a combination of the second desired color and the third desired color. As such, each subpixel of the same pixel is capable of displaying two different colors, and the combination of two colors that each subpixel is capable of displaying is different for each subpixel of the pixel.

In embodiments, pixels of the display device are divided into three subpixels. One of the subpixels includes a combination of red and green, with another subpixel including a combination of red and blue and the remaining subpixel including a combination of blue and green. A different set of three colors may be used, without limitation. Further, the subpixels may each include more than two potential colors for display, for example by including additional highlight colors in the display medium, although the control of the display device may become more complex in effecting the display of an image.

Figure 2:
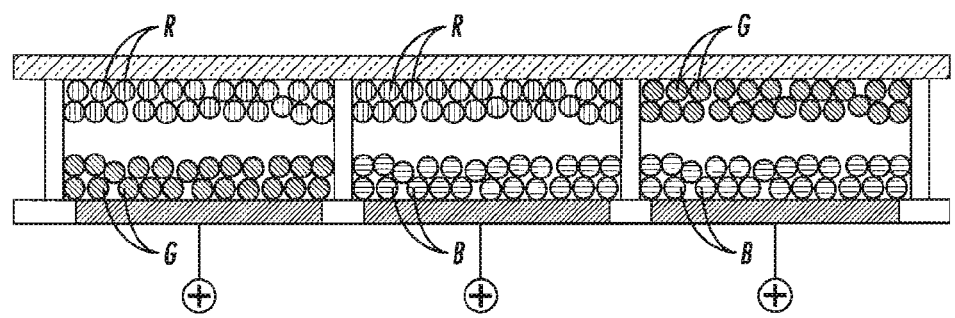
FIGS. 2-4 illustrate an example of three color states (red, blue and green) that may be displayed by a pixel comprised of three subpixels.

By use of a design in which three subpixels of a pixel each include a combination of two of three total colors, each pixel may be made to have at least about 66% of the pixel, for example two-thirds of the subpixels of the pixel, display a desired color. This is illustrated in, for example, FIGS. 2-4. In FIG. 2, the first two subpixels (from the left) are made to display the desired color red. As will be explained below, this is done by, for example as shown in FIG. 2, the set of red colored particles in each of the first two subpixels carrying a positive charge so as to be repulsed from the positive charge on the back electrode. The green colored particles in the first subpixel and the blue colored particles in the second subpixel carry a negative charge so as to be attracted to the non-viewing back substrate, and thus are not displayed to the viewer. As two-thirds of the subpixels display red, the viewer will perceive the color red at this pixel location when viewing the overall display region. The third subpixel does not include red, and in this case is made to display green. However, the third subpixel may also be made to display blue. Desirably, throughout the display region, subpixels containing two non-displayed colors may be dithered are alternated between the two non-displayed colors. For example, in this case where the pixel displays red and the subpixel containing the non-displayed colors includes blue and green, throughout the display where red pixels appear, subpixels containing the non-displayed colors are appropriately alternated between displaying green and displaying blue. In this manner, the red state pixels do not appear too bluish or too greenish. Accordingly, over the whole display, it may be advantageous to dither or alternate the color of subpixels containing two non-displayed colors in order to average out the integrated color.

Figure 3:
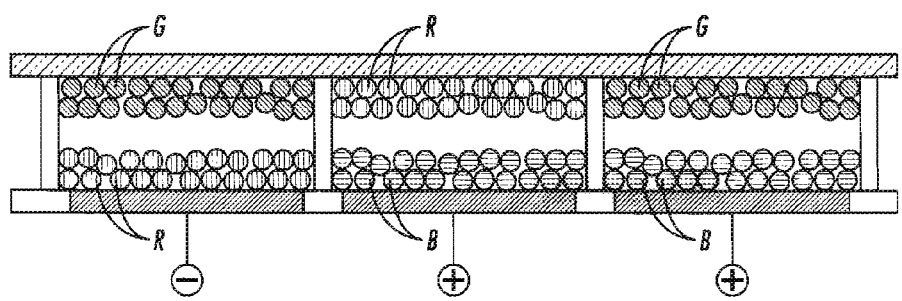

In FIG. 3, the first subpixel and the third subpixel (from the left) are made to display the desired color green. As will be explained below, this is done by, for example as shown in FIG. 3, the set of green colored particles in the first subpixel carrying a negative charge so as to be repulsed from the negative charge on the rear electrode of the first subpixel, and the set of green colored particles in the third subpixel carrying a positive charge so as to be repulsed from the positive charge on the rear electrode of the third subpixel. The red colored particles in the first subpixel carry a positive charge, and the blue colored particles in the third subpixel carry a negative charge, so as to be attracted to the non-viewing back substrate in each case, and thus are not displayed to the viewer. The second subpixel does not include green, and in this case is made to display red. As two-thirds of the subpixels display green, the viewer will perceive the color green at this pixel location when viewing the overall display region.

Figure 4:
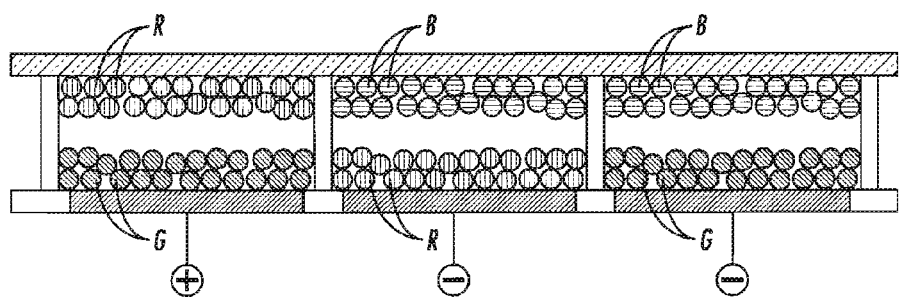

In FIG. 4, the last two subpixels (from the left) are made to display the desired color blue. As will be explained below, this is done by, for example as shown in FIG. 4, the blue set of red colored particles in each of the last two subpixels carrying a negative charge so as to be repulsed from the negative charge on the rear electrode of each of these two subpixels. The red colored particles in the second subpixel and the green colored particles in the third subpixel carry a positive charge so as to be attracted to the non-viewing back substrate, and thus are not displayed to the viewer. The first subpixel does not include blue, and in this case is made to display red. As two-thirds of the subpixels display blue, the viewer will perceive blue at this pixel location when viewing the overall display region.

Figure 5:
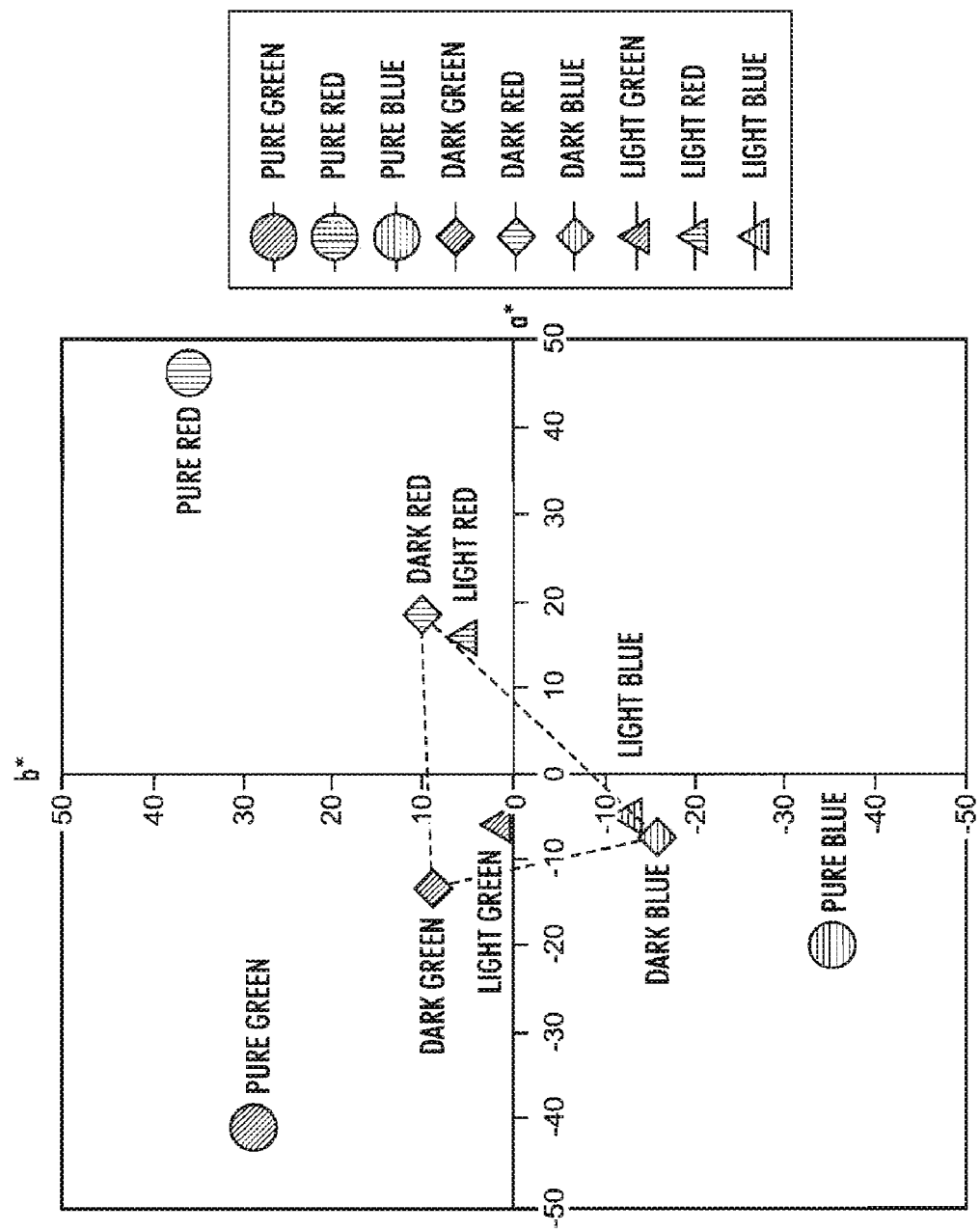
FIG. 5 is a color gamut chart showing the color range achievable from a comparative display device using black and white color display mediums and a color filter overlay.
Figure 6:
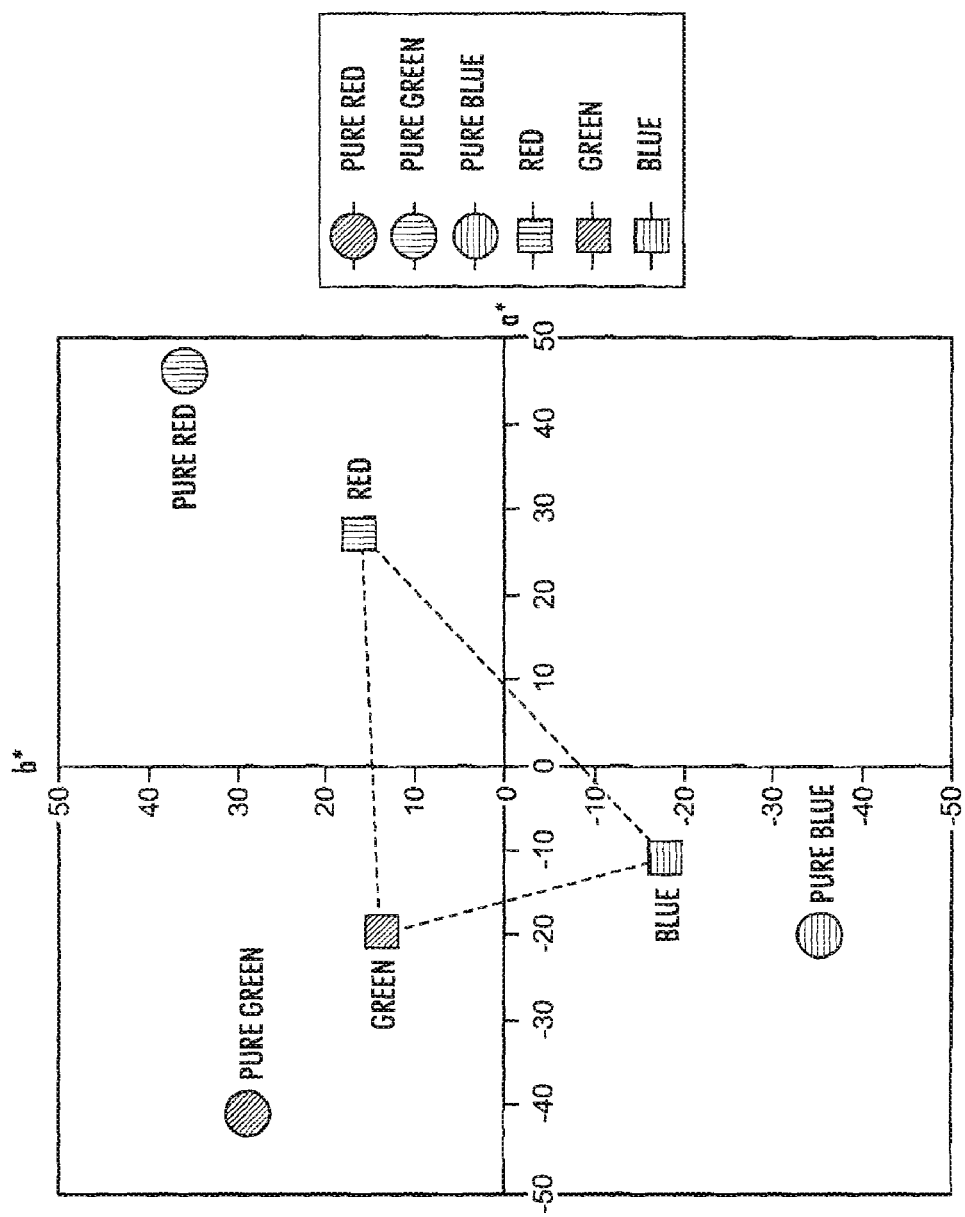
FIG. 6 is a color gamut chart showing the color range achievable from a display device as described herein using adjacent subpixels of different color combinations.

The improvement in the color of the color display in the present design over the use of color filter overlays is demonstrated in FIGS. 5 and 6. In a conventional color filter overlay design, the pixels are comprised of sets of black and white colors, and a color filter overlay is placed on the viewing side of the device so that when the color white is made to be displayed, the color filter acts to make it appear as red, green or blue. However, as a result of the color filter, color and brightness are sacrificed. For example, FIG. 5 shows the color gamut achieved by an electrophoretic device using black and white colors with a color filter overlay, while FIG. 6 shows the color gamut achieved via the adjacent subpixel approach described herein. The color gamut measurements were performed by measuring a black and white display covered with red, green and blue filters. These spectra were then used to create composite spectra for the two scenarios (color filter vs. adjacent subpixels). The composite spectra are created by using a linear combination of the intensity of each pure spectra. For example, a red-red-green pixel was approximated using $1/3$ red+$1/3$ red+$1/3$ green. A red color filter pixel was approximated by using $1/3$ red+$2/3$ black. The color range achieved by the present design is much closer to the pure color states than the color filter overlay approach, the present design covering a wider color gamut.

Figure 7:
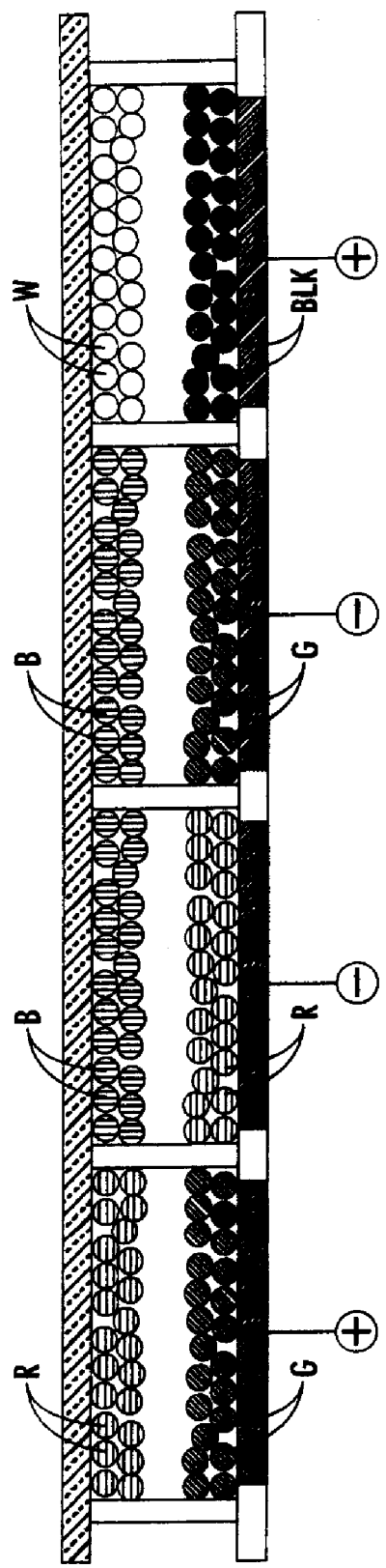
FIG. 7 illustrates an example structure of a pixel of an electrophoretic display device as described herein having four subpixels.

In embodiments, pixels may be divided into four subpixels, as shown in FIG. 7. In such embodiments, three of the four subpixels of a given pixel may be comprised of a combination of at least two colors, for example selected from among three total colors, and wherein each of the three of the four subpixels comprises a different combination of two of the colors, as discussed above. The fourth subpixel could then be comprised of a combination of black and white colors. By having a fourth pixel of black and white, the display may be made to have different levels of brightness/darkness, as well as be made to better reflect shades of colors such as black and to display black and white images. In addition, even with the addition of a fourth subpixel of black and white, at least about 50% of the subpixels of a given pixel will still be able to display a desired color other than black or white, such as red, green or blue.

As discussed above, the display medium of each subpixel should be able to display at least two colors. In this regard, the display medium may comprise one set of first colored particles dispersed in a dielectric fluid of a second color, wherein the first color and the second color are different so as to comprise the two different colors. Alternatively, the display medium may comprise two sets of differently colored particles dispersed in a substantially transparent and/or substantially colorless dielectric fluid so as to comprise the two different colors. In this latter embodiment, the dielectric fluid may also be colored for additional effect. Of course, the display medium may also be made to include only the differently colored particles in a medium of air or other gas.

Thus, for example, the electrophoretic display medium comprises one set of particles dispersed in a colored liquid system, the particles exhibiting a different, desirably contrasting color to the color of the liquid. The colored fluid system may also comprise two immiscible liquids having different densities such that the immiscible liquid having a density less than that of the other immiscible liquid rests on top of the other immiscible liquid, and the set of particles may have a density in between the densities of the two immiscible liquids such that the particles rest at an interface between the two immiscible liquids. Such two-layer liquid system may be achieved using two fluids with differing densities and that are immiscible with each other. 3M's fluoroether and Exxon's ISOPAR®M are an example of a suitable combination of fluids. Fluoroether, being denser, rests on the bottom, while ISOPAR® M, being less dense, rests on top. The particles of the display medium should have a density that is in between the densities of the two immiscible liquids so that they rest at the interface between the two layers to create the desired suspension.

The fluid system may be colored by any suitable means in the art, including through the inclusion of any suitable colorants (for example, dyes and/or dispersible pigments) therein.

The electrophoretic display fluid may also comprise at least two sets of particles dispersed in a transparent liquid system (although it may be useful to also color/tint the liquid system) or air or gas, the two sets of particles exhibiting different, desirably contrasting color and different charging properties from each other.

The dielectric fluid may be comprised of a single fluid, or it may be a mixture of two or more fluids, which mixture of fluids may either be miscible with each other or immiscible as described above. The display medium may comprise the dielectric fluid in amounts from, for example, about 30% to about 95%, such as from about 40% to about 90% or from about 40% to about 80%, by weight of the display medium, and comprise the particles in a total amount of for example, about 5% to about 70%, such as from about 10% to about 60% or from about 20% to about 60%, by weight of the display medium. Each set of differently colored particles may be contained in the display medium in approximately equal amounts, The fluid and the sets of particles therein also may have substantially matched densities, for example densities that are within about 10% of each other, or more specifically within 5% of each other or within 2% of each other.

The dielectric fluid may be comprised of any suitable fluid known in the art for display fluids. The choice of fluid may be based on concerns of chemical inertness, density matching to the particles to be suspended therein and or chemical compatibility with the particles. In embodiments, the suspending fluid may have a low dielectric constant, for example, about 4 or less, such as about 0.5 to about 2. The viscosity of the fluid may be relatively low at the temperatures of operation in order to permit the particles to move therein, for example under the influence of an electrical field. In embodiments, the fluid may have a kinematic viscosity in the range of about 0.25 centistokes to about 10 centistokes, for example from about 0.5 centistokes to about 5 centistokes or from about 1 centistoke to about 2 centistokes, at about room temperature (about 23° C. to about 27° C.). The fluid may be dielectric and substantially free of ions. The fluid also may have minimum solvent action on the colored particles therein, and a specific gravity substantially equal to the colored particles, for example within about 10% of each other. Additionally, the fluid may be chosen to be a poor solvent for some polymers, which is advantageous for use in the fabrication of particles because it increases the range of polymeric materials useful in fabricating particles.

Organic solvents such as halogenated organic solvents, saturated linear or branched hydrocarbons, silicone oils, and low molecular weight halogen-containing polymers are a few suitable types of fluids that may be used. Organic solvents may include, for example, epoxides such as, for example, decane epoxide and dodecane epoxide, vinyl ethers such as, for example, cyclohexyl vinyl ether, and aromatic hydrocarbons such as, for example, toluene and naphthalene. Halogenated organic solvents may include, for example, tetrafluorodibromoethylene, tetrachloroethylene, trifluorochloroethylene, 1,2,4-trichlorobenzene, carbon tetrachloride, mixtures thereof and the like. These materials may have high densities. Hydrocarbons may include, for example, decane, dodecane, tetradecane, xylene, toluene, hexane, cyclohexane, benzene, the aliphatic hydrocarbons in the ISOPAR™ (Exxon), NORPAR™ (a series of normal paraffinic liquids from Exxon), SHELL-SOL™ (Shell), and SOLTROL™ (Shell) series, naphtha, and other petroleum solvents. These materials may have low densities. Examples of silicone oils include octamethyl cyclosiloxane and higher molecular weight cyclic siloxanes, poly(methyl phenyl siloxane), hexamethyldisiloxane and polydimethylsiloxane. These materials may have low densities. Low molecular weight halogen-containing polymers may include, for example, poly(chlorotrifluoroethylene) polymer or KRYTOX™ polymers (Dupont).

Typically, hydrocarbon fluids such as ISOPAR M are used for electrophoretic ink applications due to their low cost, good dielectric strength, low volatility, and nonreactivity. In embodiments, the fluid may be a nonswelling fluid such as a silicone fluid. A commercially available silicone fluid includes DOW 200, a polydimethylsiloxane polymer available from Dow Corning. Other examples of suitable silicone fluids include polydimethylsiloxane fluids available from Gelest Corporation such as trimethylsiloxy terminated fluids DMS-T00, DMS-T01, DMS-T01.5, DMS-T02, DMS-T03, DMS-T05, DMS-T07, DMS-T11; cyclomethicones such as SIO6700.0, SID2650.0, SID4625.0 (also known as D4, D5, and D6 fluids, respectively); phenylmethylsiloxanes such as PMM-0011, PDM-7040; fluorosilicones such as SIB1816.0; polydiethylsiloxanes such as DES-T03, DES-T11; branched and low viscosity phenyltris(trimethylsiloxy)silane fluids such as SIP6827.0, phenethyltris(trimethylsiloxy)silane fluids such as SIP6722.8, and the like.

The fluid may include therein a thermally reversible gelling agent having a melting point temperature of at least about 35° C., for example as described in co-pending application Ser. No. 11/169,924, incorporated herein by reference in its entirety.

In embodiments, the fluid is substantially free of charge control additives and other ionic species that may affect the charging behavior of the display medium and/or the particles dispersed therein. However, in other embodiments, the fluid may contain additives such as surface modifiers to modify the surface energy or charge of the particles, such as charge control agents, dispersants, and/or surfactants.

Various embodiments of particle sets to be dispersed in the fluid of the display medium are next described. In embodiments, the display medium includes at least one set of particles wherein the particles of the set all exhibit substantially the same color. The display medium may be comprised of one set of colored particles, including at least two, such as from two to ten or from two to four, sets of differently colored particles dispersed in the fluid. Color refers to, for example, the overall absorption characteristic within the range of wavelengths of the electromagnetic spectrum. Substantially the same color herein refers to, for example, particles exhibiting substantially the same hue and contrast (darkness/lightness) as other particles in the same set. Colored particles of different sets of particles in the display medium exhibit a color, that is, an absorption characteristic, different from each other. For example, if a first set of particles exhibits a yellow color, then a second differently colored set of particles will exhibit a different shade (hue and/or contrast) of yellow or a different color altogether, for example such as cyan or magenta.

A display medium may include two sets of differently colored particles, for example black particles and white particles, red particles and blue particles, red particles and green particles, blue particles and green particles, and the like.

Each set of same colored particles in the display medium may comprise from about 5% to about 50% by weight, for example from about 5% to about 40% or from about 5% to about 30% by weight, of the display medium.

In embodiments, described is a low electrical conductivity electrophoretic display medium, for example having a conductivity on the order of about $10^{-11}$ to about $10^{-15}$ S/m, such as from about $10^{-12}$ to about $10^{-14}$ S/m or from about $10^{-12}$ to about $10^{-13}$ S/m. The conductivity of the display medium is thus comparable to that of the dielectric fluid. The particles of the display medium may become charged by the application of a high electric field thereto, which may also be referred to as field-induced or in situ charging, in which particle charging is dependent on, for example, the field strength and the charging time (or number of charging cycles). Following charging, the particles may have a charge (charge to mass ratio) on the order of microcoulombs ($\mu$C) per gram (that is, on the order of $10^{-6}$ C/g), such as from about ±0.1 to about ±20 $\mu$C/g, from about ±0.2 to about ±10 $\mu$C/g or from about ±0.3 to about ±5 $\mu$C/g.

The display medium, including the fluid and particle sets therein, of embodiments herein may thus be made to be substantially free of charge control additives and similar excess ionic species affecting the charging characteristics and/or conductivity of the display medium. Substantially free of ions herein refers, for example, to the display medium being free of ionic species to the extent that the aforementioned conductivity values may be achieved. As a result, the display medium herein is able to exhibit the aforementioned low conductivity properties.

In other display mediums, the particles are typically charged by adding a charge control agent, which is capable of ionic dissociation, to the fluid during preparation of the nonaqueous ink dispersion. Dissociation of the charge control agent into positive and negative ionic species in the dielectric fluid results in preferential surface absorption of ions of one polarity by the particles, and the particles therefore become charged. The resulting dispersion contains a complex mixture of particles including charged particles, excess free ions and counter-ions. Due to the presence of excess free ions, the electrophoretic ink is also characterized by high electrical conductivity, which increases with concentration of the added charge control agent and is typically 100-1000 times higher compared with the dielectric fluid.

As the particles of the display medium, any particle made by any suitable process may be used, so long as the particles are capable of exhibiting the low charge property discussed above. Thus, particles made by both physical grinding methods, in which the material of the particles is formed as a mass that is then crushed and ground to the desired average particle size, and chemical build-up methods, in which the particles are grown individually within a reaction medium to the desired average particle size, both of which types of methods are well known in the toner art, may be used. The particles may be made to have an average size of from, for example, about 300 nm to about 100 µm, such as from about 300 nm to about 50 µm or from about 0.5 µm to about 25 µm. The particles typically have a size less than the size of the reservoirs of the display device in which the display medium will be contained so that the particles are free to move within the reservoirs.

The particles may be neat pigments, dyed (laked) pigments, pigment/polymer composites, dyed or pigmented agglomerated polymer particles and the like. As the colorant of the particles, dyes, pigment, mixtures of dyes, mixtures of pigments or mixtures of dyes and pigments may be used. Particles and/or colorant of particles may also include laked, or dyed, pigments, in which a dye is precipitated on the particles or the particles are stained with a dye such as metal salts of readily soluble anionic dyes, for example dyes of azo, triphenylmethane or anthraquinone structure containing one or more sulphonic or carboxylic acid groupings precipitated by a calcium, barium or aluminum salt.

Typical manufacturing techniques for the above particles are drawn from the liquid toner and other arts and include ball milling, attrition, jet milling, and the like. A pigmented polymer particle may be made by, for example, compounding a pigment in the polymer. The composite material is then (wet or dry) ground to a desired size. It may then optionally be added to a carrier liquid and milled under high shear for several hours to a final particle size and/or size distribution.

Chemical processes that may be used in forming the particles include, for example, emulsion aggregation, dispersion polymerization, mini- or micro-emulsion polymerization, suspension polymerization, precipitation, phase separation, solvent evaporation, in situ polymerization, or any process of microencapsulation.

Polymers that may be used for the pigmented particles include, for example, polystyrene, polyethylene, polypropylene, phenolic resins, ethylene-vinyl acetate copolymers, polyesters, polyacrylates, polymethacrylates, ethylene acrylic acid or methacrylic acid copolymers, acrylic copolymers and terpolymers and the like. Specific example include, for example, polyethylene, polypropylene, polymethylmethacrylate, polyisobutylmethacrylate, polystyrene, polybutadiene, polyisoprene, polyisobutylene, polylauryl methacrylate, polystearyl methacrylate, polyisobornyl methacrylate, poly-t-butyl methacrylate, polyethyl methacrylate, polymethyl acrylate, polyethyl acrylate, polyacrylonitrile, and copolymers of two or more of these materials.

Examples of suitable polyester resins for the emulsion aggregation particles include polyethylene terephthalate, polypropylene terephthalate, polybutylene terephthalate, polypentylene terephthalate, polyhexalene terephthalate, polyheptadene terephthalate, polyoctalene terephthalate, polyethylene sebacate, polypropylene sebacate, polybutylene sebacate, polyethylene adipate, polypropylene adipate, polybutylene adipate, polypentylene adipate, polyhexalene adipate, polyheptadene adipate, polyoctalene adipate, polyethylene glutarate, polypropylene glutarate, polybutylene glutarate, polypentylene glutarate, polyhexalene glutarate, polyheptadene glutarate, polyoctalene glutarate polyethylene pimelate, polypropylene pimelate, polybutylene pimelate, polypentylene pimelate, polyhexalene pimelate, polyheptadene pimelate, poly(propoxylated bisphenol fumarate), poly (propoxylated bisphenol succinate), poly(propoxylated bisphenol adipate), poly(propoxylated bisphenol glutarate), mixtures, copolymers or combinations thereof, and the like.

Polyester toner particles, formed by the emulsion aggregation process, are illustrated in a number of patents, such as U.S. Pat. No. 5,593,807, U.S. Pat. No. 5,290,654. U.S. Pat. No. 5,308,734, and U.S. Pat. No. 5,370,963, each of which is incorporated herein by reference in their entirety. Further examples of suitable polyester particles include those having lithium and/or sodium sulfonated polyester resin as disclosed in a number of patents, such as U.S. Pat. Nos. 6,387,581 and 6,395,445, each of which is incorporated herein by reference in their entirety. The polyester may comprise any of the polyester materials described in the aforementioned references.

Examples of suitable acrylate resin binders for the emulsion aggregation particles include, for example, polymers such as poly(styrene-alkyl acrylate), poly(styrene-1,3-diene), poly(styrene-alkyl methacrylate), poly(styrene-alkyl acrylate-acrylic acid), poly(styrene-1,3-diene-acrylic acid), poly (styrene-alkyl methacrylate-acrylic acid), poly(alkyl methacrylate-alkyl acrylate), poly(alkyl methacrylate-aryl acrylate), poly(aryl methacrylate-alkyl acrylate), poly(alkyl methacrylate-acrylic acid), poly(styrene-alkyl acrylate-acrylonitrile-acrylic acid), poly(styrene-1,3-diene-acrylonitrile-acrylic acid), and poly(alkyl acrylate-acrylonitrile-acrylic acid); the latex contains a resin selected from the group consisting of poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly (styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), polystyrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), and poly(styrene-butyl acrylate-acrylonitrile-acrylic acid).

Acrylate toner particles created by the emulsion aggregation process are illustrated in a number of patents, such as U.S. Pat. No. 5,278,020, U.S. Pat. No. 5,346,797, U.S. Pat. No. 5,344,738, U.S. Pat. No. 5,403,693, U.S. Pat. No. 5,418, 108, and U.S. Pat. No. 5,364,729, each of which is incorporated herein by reference in their entirety. The acrylate may comprise any of the materials described in the aforementioned references. In embodiments, the acrylate polymer may be a styrene-acrylate copolymer, such as styrene-butyl acrylate that may also be comprised of β-carboxyethyl acrylate.

In embodiments, the emulsion aggregation particles are made to have an average particle size of from about 0.5 to about 25 µm, for example about 5 to about 15 µm or about 5 to about 12 µm. The particle size may be determined using any suitable device, for example a conventional Coulter counter.

The emulsion aggregation particles also may have a substantially monodisperse size such that the upper geometric standard deviation (GSD) by volume for (D84/D50) is in the range of from about 1.1 to about 1.25. The particle diameters at which a cumulative percentage of 50% of the total toner particles are attained are defined as volume D50, and the particle diameters at which a cumulative percentage of 84% are attained are defined as volume D84. These aforementioned volume average particle size distribution indexes GSDv can be expressed by using D50 and D84 in cumulative distribution, wherein the volume average particle size distribution index GSDv is expressed as (volume D84/volume D50). The upper GSDv value for the toner particles indicates that the toner particles are made to have a very narrow particle size distribution.

The emulsion aggregation particles also may be made to be highly circular, thereby exhibiting better flow properties with respect to movement within the display medium. In other words, rounder/smoother particles have a higher electrophoretic mobility, and thus a faster response time within the display. The circularity is a measure of the particles closeness to a perfect sphere. A circularity of 1 identifies a particle having the shape of a perfect circular sphere. The emulsion aggregation particles may have an average circularity of about 0.92 to about 0.99, for example from about 0.94 to about 0.98 or from about 0.95 to about 0.97. The circularity may be determined using the known Malvern Sysmex Flow Particle Image Analyzer FPIA-2100.

While pigment/polymer composite particles, for example composite particles created by a physical-chemical process such as grinding/attrition of pigment/polymer or by surface treatment/grafting of stabilizing polymeric groups on the surface, may be used herein, such composite particles may have polydisperse particles that exhibit variable charging characteristics. Thus, in embodiments, the particles for the display medium are emulsion aggregation particles, for example including polyester resin based emulsion aggregation particles and styrene-acrylate or acrylate resin based emulsion aggregation particles. Such particles are chemically grown and tend to be substantially monodisperse in size and substantially spherical in shape. Another advantage to emulsion aggregation particles is that the particle surface is substantially completely passivated by the binder resin, which may eliminate the contribution of the colorant, such as pigment, to the particle charge. Desirable particles are described in detail in U.S. application Ser. No. 11/419,436, incorporated herein by reference in its entirety.

In addition to the polymer binder and the colorant, the particles may also contain a wax dispersion, Linear polyethylene waxes such as the POLYWAX® line of waxes available from Baker Petrolite are useful. Of course, the wax dispersion may also comprise polypropylene waxes, other waxes known in the art, including carnauba wax and the like, and mixtures of waxes. The toners may contain from, for example, about 1 to about 15% by weight of the particles, on a solids basis, of the wax, for example from about 3 to about 12% or from about 5 to about 10% by weight.

In addition, the colored particles may also optionally contain a coagulant and/or a flow agent such as colloidal silica. Suitable optional coagulants include any coagulant known or used in the art, including the well known coagulants polyaluminum chloride (PAC) and/or polyaluminum sulfosilicate (PASS). The coagulant is present in the toner particles, exclusive of external additives and on a dry weight basis, in amounts of from 0 to about 3% by weight of the toner particles, for example from about greater than 0 to about 2% by weight of the toner particles. The flow agent, if present, may be any colloidal silica such as SNOWTEX OL/OS colloidal silica. The colloidal silica is present in the toner particles, exclusive of external additives and on a dry weight basis, in amounts of from 0 to about 15% by weight of the toner particles, for example from about greater than 0 to about 10% by weight of the toner particles.

Although not required, the toner may also include additional known positive or negative charge additives in effective suitable amounts of, for example, from about 0.1 to about 5 weight percent of the toner, such as quaternary ammonium compounds inclusive of alkyl pyridinium halides, bisulfates, organic sulfate and sulfonate compositions such as disclosed in U.S. Pat. No. 4,338,390, cetyl pyridinium tetrafluoroborates, distearyl dimethyl ammonium methyl sulfate, aluminum salts or complexes, and the like.

In embodiments, one or more sets of the colored particles incorporated into the display medium comprise crosslinked emulsion aggregation particles. The crosslinking may be achieved by any suitable method, including, for example, thermal curing or radiation, for example UV, curing. Crosslinked refers to, for example, the high molecular weight state achieved by including crosslinkable monomer or oligomer additives in a composition along with an initiator and exposing the composition to a curing environment (for example, elevated temperature for thermal curing or UV light for radiation curing) to effect curing of the additives. Other components of the composition, for example the other binder resin components, may also participate in the crosslinking.

Gel content may be used to define the extent of crosslinking in the particles. The crosslinking forms a gel portion that has significantly increased strength and less solvent solubility with respect to the individual polymer chains. Gel content refers to the proportion of the polymer chains of the polymer particles that have been crosslinked, thereby constituting a part of the gel network. In embodiments, the particles may have a gel content from about 10 percent to about 100 percent, for example from about 20 to about 80 percent or from about 25 to about 75 percent.

The gel content of the polymer particles is quantitatively measured, for example by continuously extracting, for example by soxhlet extraction, the reaction product after crosslinking processing is complete, by which the weight of the crosslinked polymer material can be obtained. A continuous extraction method allows polymers that are soluble to be removed from the mass of crosslinked polymer that typically is not soluble in most or any solvents. Accordingly, the use of a solvent in which the polymer is soluble, and in which the crosslinked portions are insoluble, is used for the procedure. By dividing the weight of the crosslinked polymer material by the total weight of the material that was continuously extracted, and multiplying by 100, the gel content value may be obtained. The degree of crosslinking may be regulated by controlling the time and/or intensity of the crosslinking procedure, and/or by the concentration of the crosslinkable materials in the particles.

Crosslinkable particles may be prepared by including in the binder one or more crosslinking additives. After the emulsion aggregation particle formation process described above, the toner particles are subjected to a radiation curing step, for example comprising UV radiation, to effect the crosslinking process, resulting in a robust particle with excellent resistance to solvent swelling, and also having enhanced resistance to softening/melting at elevated temperatures.

The crosslinking additives may be added to any type of emulsion aggregation resin binder to permit the particles made therefrom to be UV crosslinkable. The one or more crosslinking additives thus may be included in either acrylate or polyester type emulsion aggregation resins. The additive may be present in an amount of from, for example, about 0.5 to about 50% by weight, for example from about 0.5 to about 25% by weight or from about 1 to about 20% by weight of the total binder in the particles.

Examples of the crosslinking additives include multifunctional acrylates such as diacrylates, triacrylates, tetraacrylates, and the like. For example, the multifunctional acrylate monomer or oligomer, may include diacrylates such as propoxylated neopentyl glycol diacrylate (available from Atofina as Sartomer SR 9003), 1,6-hexanediol diacrylate (Sartomer SR 238), tripropylene glycol diacrylate, dipropylene glycol diacrylate, aliphatic diacrylate oligomer (CN 132 from Atofina), aliphatic urethane diacrylate (CN 981 from Atofina), aromatic urethane diacrylate (CN 976 from Atofina) and the like, triacrylate or higher functionality monomers or oligomers such as amine modified polyether acrylates (available as PO 83 F, LR 8869, and/or LR 8889 from BASF Corporation), trimethylol propane triacrylate (Sartomer SR 351), tris(2-hydroxy ethyl) isocyanurate triacrylate (Sartomer SR 368), aromatic urethane triacrylate (CN 970 from Atofina), dipentaerythritol penta-/hexa-acrylate, pentaerythritol tetraacrylate (Sartomer SR 295), ethoxylated pentaerythritol tetraacrylate (Sartomer SR 494), dipentaerythritol pentaacrylate (Sartomer SR 399) and the like, or mixtures of any of the foregoing. Additional examples of suitable crosslinking additives include chlorinated polyester acrylate (Sartomer CN 2100), amine modified epoxy acrylate (Sartomer CN 2100), aromatic urethane acrylate (Sartomer CN 2901), and polyurethane acrylate (Laromer LR 8949 from BASF). Other unsaturated curable resins that may be used are described in U.S. Patent Publication No. 2005/0137278 A1, which is herein incorporated by reference in its entirety.

A crosslinking initiator may also be included in the crosslinking additives. Photoinitiators such as 2,4,6-trimethylbenzoyldiphenylphosphine oxide (available as BASF Lucirin TPO), 2,4,6-trimethylbenzoylethoxyphenylphosphine oxide (available as BASF Lucirin TPO-L), bis(2,4,6-trimethylbenzoyl)-phenyl-phosphine oxide (available as Ciba IRGACURE, 819) and other acyl phosphines, 2-benzyl 2-dimethylamino 1-(4-morpholinophenyl) butanone-1 (available as Ciba IRGACURE 369), titanocenes, and isopropylthioxanthone, 1-hydroxy-cyclohexylphenylketone, benzophenone, 2,4,6-trimethylbenzophenone, 4-methylbenzophenone, 2-methyl-1-(4-methylthio)phenyl-2-(4-morpholinyl)-1-propanone, diphenyl-(2,4,6-trimethylbenzoyl) phosphine oxide, 2,4,6-trimethylbenzoylphenylphlosphinic acid ethyl ester, oligo(2-hydroxy-2-methyl-1-(4-(1-methylvinyl)phenyl) propanone), 2-hydroxy-2-methyl-1-phenyl-1-propanone, benzyl-dimethylketal, and mixtures thereof may be used. Amine synergists, for example such as ethyl-4-dimethylaminobenzoate and 2-ethylhexyl-4-dimethylamino benzoate, may also be used. This list is not exhaustive, and any known photoinitiator that initiates the free radical reaction upon exposure to a desired wavelength of radiation such as UV light can be used.

The total amount of photoinitiator included in the particles with respect to the radically curable component may be from, for example, about 0.5 to about 20%, for example preferably from about 1 to about 15% or from about 1 to about 10%, by weight.

As dyes for the colorant of the particles, examples of suitable dyes include Usharect Blue 86 (Direct Blue 86), available from Ushanti Colour; Intralite Turquoise 8GL (Direct Blue 86), available from Classic Dyestuffs; Chemictive Brilliant Red 7BH (Reactive Red 4), available from Chemiequip; Levafix Black EB, available from Bayer; Reactron Red H8B (Reactive Red 31), available from Atlas Dye-Chem; D&C Red #28 (Acid Red 92), available from Warner-Jenkinson; Direct Brilliant Pink B, available from Global Colors; Acid Tartrazine, available from Metrochem Industries; Cartasol Yellow 6GF Clariant; Carta Blue 2GL, available from Clariant; and the like. Particularly preferred are solvent dyes; within the class of solvent dyes, spirit soluble dyes are preferred because of their compatibility with the ink vehicles of the present invention. Examples of suitable spirit solvent dyes include Neozapon Red 492 (BASF); Orasol Red G (Ciba); Direct Brilliant Pink B (Global Colors); Aizen Spilon Red C-BH (Hodogaya Chemical); Kayanol Red 3BL (Nippon Kayaku); Spirit Fast Yellow 3G; Aizen Spilon Yellow C-GNH (Hodogaya Chemical); Cartasol Brilliant Yellow 4GF (Clariant); Pergasol Yellow CGP (Ciba); Orasol Black RLP (Ciba); Savinyl Black RLS (Clariant); Morfast Black Conc. A (Rohm and Haas); Orasol Blue GN (Ciba); Savinyl Blue GLS (Sandoz); Luxol Fast Blue MBSN (Pylam); Sevron Blue 5GMF (Classic Dyestuffs); Basacid Blue 750 (BASF), and the like. Neozapon Black X51[C.I. Solvent Black, C.I. 12195] (BASF), Sudan Blue 670 [C. I. 61554] (BASF), Sudan Yellow 146 [C.I. 12700] (BASF), and Sudan Red 462 [C.I. 260501] (BASF) are preferred.

Examples of pigments that may be used as the particles herein, or that may be used as the colorant in polymer particles, include neat pigments such as, for example, titania, barium sulfate, kaolin, zinc oxide, carbon black and the like. The pigment should be insoluble in the suspending fluid. Additional pigments may include, for example, carbon black such as REGAL 330 carbon black, acetylene black, lamp black, aniline black, Violet PALIOGEN Violet 5100 (BASF); PALIOGEN Violet 5890 (BASF); HELIOGEN Green L8730 (BASF); LITHOL Scarlet D3700 (BASF); SUNFAST® Blue 15:4 (Sun Chemical 249-0592); Hostaperm Blue B2G-D (Clariant); Permanent Red P-F7RK; Hostaperm Violet BL (Clariant); LITHOL Scarlet 4440 (BASE); Bon Red C (Dominion Color Company); ORACET Pink RF (Ciba); PALIOGEN Red 3871 K (BASF); SUNFAST® Blue 15:3 (Sun Chemical 249-1284); PALIOGEN Red 3340 (BASF); SUNFAST® Carbazole Violet 23 (Sun Chemical 246-1670); LITHOL Fast Scarlet L4300 (BASF); Sunbrite Yellow 17 (Sun Chemical 275-0023); HELIOGEN Blue L6900, L7020 (BASF); Sunbrite Yellow 74 (Sun Chemical 272-0558); SPECTRA PAC® C Orange 16 (Sun Chemical 276-3016); HELIOGEN Blue K6902, K6910 (BASF); SUNFAST® Magenta 122 (Sun Chemical 228-0013); HELIOGEN Blue D6840, D7080 (BASF); Sudan Blue OS (BASF); NEOPEN Blue FF4012 (BASF); PV Fast Blue B2GO1 (Clariant); IRGALITE Blue BCA (Ciba); PALIOGEN Blue 6470 (BASF); Sudan Orange G (Aldrich), Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Lumogen Yellow D0790 (BASF); Suco-Yellow L1250 (BASF); Suco-Yellow D1355 (BASF); Suco Fast Yellow D1 355, D1 351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT), PALIOGEN Black L0084 (BASF); Pigment Black K801 (BASF); mixtures thereof and the like.

In polymer particles, the colorant may be included in the particles in an amount of from, for example, about 0.1 to about 75% by weight of the particle, for example from about 1 to about 50% by weight or from about 3 to about 25% by weight of the particle.

In any of the foregoing particle embodiments, the particles may also include one or more external additives on the surfaces thereof. Such external additives may be applied by blending, for example with a Henschel blender. In embodiments, the external additive package may include one or more of silicon dioxide or silica ($SiO_2$), titanium dioxide or titania ($TiO_2$), titanic acid, cerium oxide, calcium or zinc stearate, and the like. The particles may have an average size (diameter) of from about 5 nm to about 250 nm. Mixtures of differently sized particles may also be used, for example a first silica having an average primary particle size, measured in diameter, in the range of, for example, from about 5 nm to about 50 nm, such as from about 5 nm to about 25 n-m or from about 20 nm to about 40 nm and a second silica having an average primary particle size, measured in diameter, in the range of, for example, from about 100 nm to about 200 nm, such as from about 100 nm to about 150 nm or from about 125 nm to about 145 nm. The external additive particles may also be treated with a surface material.

In embodiments, the external additives may be used to impart charge to the particles. For example, a silica particle treated with polydimethylsiloxane (PDMS) or hexamethyldisilane (HMDS) can impart a positive charge. A titanic acid treated with isobutyl trimethoxysilane can impart a negative charge.

Images may be developed with the present electrophoretic display device as described in U.S. Pat. No. 6,574,034, incorporated herein by reference in its entirety, for example by applying an electric field to the individual reservoirs (pixels/subpixels) as desired so that the reservoir displays the desired color. For example, if two particle sets of opposite charge and visual contrast color are used, a positive electric field will orient the first set of particles at the top of the display device thus displaying the color of the first set of particles and a negative electric field will orient the second set of particles at the top of the display device thus displaying the color of the second set of particles. In this manner, an image can be developed and displayed by the display device.

Images may also be developed with the present electrophoretic display device as described in U.S. patent applications Ser. Nos. 11/419,472 and 11/419,434, each incorporated herein by reference in its entirety. Thus, in embodiments, the display medium is a low electrical conductivity electrophoretic display medium, for example having a conductivity on the order of about $10^{-11}$ to about $10^{-15}$ S/m, such as from about $10^{-12}$ to about $10^{-14}$ S/m or from about $10^{-12}$ to about $10^{-13}$ S/m. The conductivity of the display medium is thus comparable to that of the dielectric fluid. The particles of the display medium may become charged by the application of a high electric field thereto, which may also be referred to as field-induced or in situ charging, in which particle charging is dependent on, for example, the field strength and the charging time (or number of charging cycles). Following charging, the particles may have a charge (charge to mass ratio) on the order of microcoulombs (μC) per gram (that is, on the order of $10^{-6}$ C/g), such as from about ±0.1 to about ±20 μC/g, from about ±0.2 to about ±10 μC/g or from about ±0.3 to about ±5 μC/g.

That is, the particles may first be in-situ or field-induced charged to have an appropriate charge, and thereafter subjected to manipulation via application of an appropriate electric field as discussed above. For example, the charging may be accomplished by application of an electric field having a strength of about 0.05 V/μm to about 5 V/μm for about 0.001 seconds to about 5 hours, such that the charging results in the particles of the sets of differently colored particles having the above charge. The electric field applied to manipulate movement of the particles in the reservoirs may be applied at about 0.1 V/μm to about 25 V/μm.

Thus, in operating the display device so as to form an image therewith, an electric field, in particular a reversible direct current or an alternating current, is applied via the electrodes in order to move desired ones of the sets of colored particles in the display medium at desired locations of the display device to be displayed so as to display a desired color surface thereof to a viewer. The individual reservoirs, or groups of individual reservoirs, for example a group of from about 1 to about 50 reservoirs or from about 1 to about 10 reservoirs, may be independently addressable, that is, a separate electric field may be applied to each individual or small group of reservoirs in order to generate an appropriate color at that individual location of the device. Appropriate larger sets or groups of different ones of the reservoirs may also be associated with a same driving electrode, if desired. Thus, in a display, each reservoir or a group of reservoirs may represent a pixel or subpixel of an image, and each pixel or subpixel may thus be separately controlled to generate a desired overall image from the device. Each pixel or subpixel can be individually addressed, and a full page image can thus be generated. Control methods, including hardware/software, for controlling each reservoir and/or electrode of the display device in a manner enabling, an overall image to be shown are known in the display arts, and any such control method may be applied herein. To permit individual addressability, the size of the electrodes may be the same as or smaller than the size of the individual reservoirs or a small group of reservoirs of the display device, enabling individual control of each. In this manner, the electric field applied to each can be individually controlled. Also, the size of the electrodes can be different (for example, larger than) from the size of the reservoirs, thereby enabling more than one reservoir to be controlled by a single electrode. Thus, the pattern of the electrodes does not need to line up with the pattern of individual reservoirs of the display layer. Any of the foregoing can be done by, for example, appropriate patterning of the conductive path on one or more of the conductive substrates. An example of the patterning of electrodes can be found in, for example, U.S. Pat. No. 3,668,106, incorporated herein by reference in its entirety.

It will be appreciated that various of the above-disclosed and other features and functions, or alternatives thereof, may be desirably combined into manly other different systems or applications. Also, various presently unforeseen or unanticipated alternatives, modifications, variations or improvements therein may be subsequently made by those skilled in the art, and are also intended to be encompassed by the following claims.

What is claimed is:

1. An electrophoretic display device, comprising a display region between substrates, at least one of which is transparent, the display region including a multiplicity of pixels, wherein one or more of the pixels comprises three subpixels, the three subpixels being comprised of individual reservoirs that each contain a display medium comprised of one or more sets of colored particles in a dielectric fluid, the display medium including two different colors therein so that the subpixel is capable of exhibiting each of the two different colors, and wherein each of the three subpixels of a single pixel of the one or more pixels includes a display medium having a different combination of two colors from the display mediums of all of the other of the three subpixels of the single pixel, wherein the two different colors are selected from a group of colors consisting of red, green and blue, and wherein at least two of the subpixels of the single pixel are capable of displaying a same color, and wherein one or more of the pixels further comprises a fourth subpixel, wherein the fourth subpixel includes a display medium comprised of black and white colors.

2. The electrophoretic display device according to claim 1, wherein the display medium of one or more of the subpixels comprises one set of first colored particles dispersed in a dielectric fluid of a different color, so as to comprise the two different colors.

3. The electrophoretic display device according to claim 1, wherein the display medium of one or more of the subpixels comprises two sets of differently colored particles dispersed in a substantially transparent dielectric fluid so as to comprise the two different colors.

4. The electrophoretic display device according to claim 1, wherein the display medium of a first subpixel includes red and green, the display medium of a second subpixel includes red and blue, and the display medium of a third subpixel includes green and blue.

5. The electrophoretic display device according to claim 1, wherein the display medium of a first subpixel of the four subpixels includes red and green, the display medium of a second subpixel of the four subpixels includes red and blue, and the display medium of a third subpixel of the four subpixels includes green and blue.

6. The electrophoretic display device according to claim 1, wherein at least two of the four subpixels of a given pixel are capable of displaying a same color.

7. The electrophoretic display device according to claim 1, wherein the subpixels have an average maximum width of about 10 to about 1,000 μm.

8. The electrophoretic display device according to claim 1, wherein each of the subpixels is individually addressable via an electrode associated therewith.

9. An electrophoretic display device, comprising a display region between substrates, at least one of which is transparent, the display region including a multiplicity of pixels, wherein one or more of the pixels comprise three subpixels, the three subpixels being comprised of individual reservoirs that each contain a display medium comprised of one or more sets of colored particles in a dielectric fluid, the display medium including at least two different colors therein so that the subpixel is capable of exhibiting each of the at least two different colors, and wherein a first subpixel of the three subpixels includes a display medium having a combination of a first color and a second color, a second subpixel of the three subpixels includes a display medium having a combination of the first color and a third color, and a third subpixel of the three or more subpixels includes a display medium having a combination of the second color and the third color, wherein the first color, the second color and the third color are selected from a group of colors consisting of red, green and blue, wherein two of the three subpixels of a single subpixel are capable of displaying a same color, and wherein one or more of the pixels further comprises a fourth subpixel, a display medium of the fourth subpixel including a black color and a white color.

10. The electrophoretic display device according to claim 9, wherein the display medium of one or more of the subpixels comprises one set of first colored particles dispersed in a dielectric fluid of a different color, so as to comprise the two different colors.

11. The electrophoretic display device according to claim 9, wherein the display medium of one or more of the subpixels comprises two sets of differently colored particles dispersed in a substantially transparent dielectric fluid so as to comprise two different colors.

12. The electrophoretic display device according to claim 9, wherein the first color is red, the second color is green and the third color is blue.

13. The electrophoretic display device according to claim 9, wherein each of the subpixels is individually addressable via an electrode associated therewith.

14. A method of displaying an image in an electrophoretic display device that is comprised of a display region between substrates, at least one of which is transparent, the display region including a multiplicity of pixels, wherein one or more of the pixels comprise three or more subpixels that are each individually addressable via an electrode associated therewith, the three or more subpixels being comprised of individual reservoirs that each contain a display medium comprised of one or more sets of colored particles in a dielectric fluid, the display medium including at least two different colors therein so that the subpixel is capable of exhibiting each of the at least two different colors, and wherein a first subpixel of the three or more subpixels includes a display medium having a combination of a first color and a second color, a second subpixel of the three or more subpixels includes a display medium having a combination of the first color and a third color, and a third subpixel of the three or more subpixels includes a display medium having a combination of the second color and the third color, wherein the first color, the second color and the third color are selected from a group of colors consisting of red, green and blue, the method comprising:

applying an electric field via the electrode to the two of the three or more subpixels that include the first color, second color or third color desired to be displayed by the pixel to effect movement of the one or more sets of colored particles in the display medium to display the desired color on a viewing side of the display device, wherein for displaying the first color, the electric field is applied to the first subpixel and to the second subpixel so that the first subpixel and the second subpixel display the first color on the viewing side, wherein for displaying the second color, the electric field is applied to the first subpixel and to the third subpixel so that the first subpixel and the third subpixel display the second color on the viewing side, and wherein for displaying the third color, the electric field is applied to the second subpixel and to the third subpixel so that the second subpixel and the third subpixel display the third color on the viewing side, and wherein one or more of the pixels comprise a fourth subpixel, the display medium of the fourth subpixel comprising a display medium including a black color and a white color, wherein the electric field is applied to the fourth subpixel in a manner to display either the black color or the white color.

15. The method according to claim 14, wherein the first color is red, the second color is green and the third color is blue.

16. The method according to claim 14, wherein the display mediums of each subpixel are comprised of two differently colored particle sets, one set for each of the at least two colors therein, dispersed in a substantially transparent dielectric fluid.

17. The method according to claim 16, wherein each set of the differently colored particles in a display medium have an opposite charge so that application of the electric field manipulates the one set of colored particles having the color desired to be displayed to a surface on the viewing side of the device and manipulates the other set of colored particles to an opposite non-viewing side of the device.

* * * * *